United States Patent
Hunig et al.

(10) Patent No.: US 9,708,218 B2
(45) Date of Patent: Jul. 18, 2017

(54) METHOD FOR MICROWAVE CURING OF MINERAL WOOL INCLUDING BINDER MATERIAL

(71) Applicant: SAINT-GOBAIN ISOVER, Courbevoie (FR)

(72) Inventors: Hagen Hunig, Dossenheim (DE); Horst Keller, Ostringen (DE); Romain Lecomte, Cologne (DE); Ulrich Passon, Karlsruhe (DE); Anton Zysik, Kurten-Bechen (DE)

(73) Assignee: SAINT-GOBAIN ISOVER, Courbevoie (FR)

( * ) Notice: Subject to any disclaimer, the term of this patent is extended or adjusted under 35 U.S.C. 154(b) by 200 days.

(21) Appl. No.: 14/422,122

(22) PCT Filed: Jul. 31, 2013

(86) PCT No.: PCT/EP2013/002275
§ 371 (c)(1),
(2) Date: Feb. 17, 2015

(87) PCT Pub. No.: WO2014/026736
PCT Pub. Date: Feb. 20, 2014

(65) Prior Publication Data
US 2015/0218051 A1   Aug. 6, 2015

(30) Foreign Application Priority Data

Aug. 17, 2012   (DE) .................. 10 2012 016 540

(51) Int. Cl.

| | | |
|---|---|---|
| *C04B 26/12* | (2006.01) | |
| *C04B 26/28* | (2006.01) | |
| *C04B 28/02* | (2006.01) | |
| *C04B 40/00* | (2006.01) | |
| *C04B 26/04* | (2006.01) | |
| *F16L 59/02* | (2006.01) | |
| *H05B 6/64* | (2006.01) | |

(52) U.S. Cl.
CPC ............ *C04B 26/04* (2013.01); *C04B 26/122* (2013.01); *C04B 26/28* (2013.01); *C04B 26/285* (2013.01); *C04B 28/02* (2013.01); *C04B 40/0014* (2013.01); *F16L 59/028* (2013.01); *H05B 6/6491* (2013.01)

(58) Field of Classification Search
CPC ... C05B 26/04; C05B 40/0014; H05B 6/6491; F16L 59/028
See application file for complete search history.

(56) References Cited

U.S. PATENT DOCUMENTS

| | | |
|---|---|---|
| 2,051,193 A | 8/1936 | Wittel |
| 4,879,444 A * | 11/1989 | Bichot .................. B29C 35/08 156/379.9 |
| 5,244,722 A | 9/1993 | Kummermehr et al. |
| 9,401,808 B2 | 7/2016 | Ogura et al. |

FOREIGN PATENT DOCUMENTS

| | | |
|---|---|---|
| DE | 2941606 A1 | 4/1981 |
| DE | 3937472 | 6/1990 |
| DE | 4212117 | 10/1993 |
| DE | 4215178 | 11/1993 |
| DE | 102008029058 | 12/2009 |
| DE | 102009004176 | 8/2010 |
| EP | 989103 * | 2/2000 |
| EP | 0983474 | 3/2000 |
| EP | 0989103 A1 | 3/2000 |
| EP | 1924422 | 5/2008 |
| EP | 2062660 | 5/2009 |
| FR | 2548586 A1 | 1/1985 |
| GB | 2245893 A | 1/1992 |
| JP | H 07506295 | 7/1995 |
| JP | 2000-502983 | 3/2000 |
| WO | WO 95/20708 A1 | 8/1995 |
| WO | WO 2011/030052 A2 | 3/2011 |

OTHER PUBLICATIONS

International Search Report prepared by the European Patent Office on Dec. 5, 2013, for International Application No. PCT/EP2013/002275.

Official Action (with English machine translation) for Japanese Patent Application No, 2015-526894, mailed Mar. 21, 2017, 11 pages.

* cited by examiner

*Primary Examiner* — Carol M Koslow
(74) *Attorney, Agent, or Firm* — Sheridan Ross P.C.

(57) ABSTRACT

In a method for curing mineral wool that is mixed with binder through microwaves, generating additional heat through installation of microwave active substances is performed through curing the binder material.

20 Claims, No Drawings

METHOD FOR MICROWAVE CURING OF MINERAL WOOL INCLUDING BINDER MATERIAL

CROSS REFERENCE TO RELATED APPLICATIONS

This application is a national stage application under 35 U.S.C. 371 and claims the benefit of PCT Application No. PCT/EP2013/002275 having an international filing date of Jul. 31, 2013, which designated the United States, which PCT application claimed the benefit of German Patent Application No. 102012016540.4 filed Feb. Aug. 17, 2012, the disclosures of which are incorporated herein by reference.

The invention relates to a method for microwave curing mineral wool that is mixed with a binder material.

It is well known that mineral wool insulation products are produced in that fibers produced through a suitable fiber production device from a glass or rock melt are collected through one or plural drop channels on an endless conveyor belt to form a mineral wool web that is configured as a raw fleece, wherein suitable binder material is typically added to the fibers before they hit the conveyor belt; the binder is added in particular through a spraying process. Typically a phenolic formaldehyde resin or a urea phenolic formaldehyde resin is used for binder material. The portion of the binder material is product-related. The binder material is used for structural stability of the mineral wool insulation product and does not contribute to the insulation effect itself. Since the binder material also causes an increased fire load, attempts are made to limit the binder material to the required amount. Typical binder material amounts are in the range of 2 to 5% of total weight of the mineral wool which, however, is not limiting.

The raw fleece that is mixed with binder material is run through an oven for curing, wherein tunnel ovens are typically being used. The heat supply is provided by flowing the raw fleece with a hot gas which causes a curing of the binder material while running through the tunnel oven which causes the structural stability of the mineral wool product produced. Thus, the water percentage of the typically watery binder material is evaporated and subsequently the solid portion of the binder material is polymerized through the heat supply.

Tunnel ovens have the advantage of a simple configuration, a uniform heat introduction and thus facilitate even curing of different products, in particular of mineral wool webs with different thickness and through being provided as a flow-through ovens facilitate feeding the continuous mineral wool web as an endless web. The mineral wool web is thus typically run in a compressed condition in order to adjust a desired raw density of the end product. After leaving the tunnel oven, the cured mineral wool webs are divided into desired lengths for forming the insulation material products.

However, also other ovens are suited for particular mineral wool products, namely in particular tube shells. Such tube shells, differently from mineral wool webs, do not provide a closed endless web within a tunnel oven in feed direction, but are provided at a certain distance adjacent from one another as formed blanks. When curing in a tunnel oven, in particular no flow-through of the uncured mineral wool raw material blanks is provided, so that a heat introduction is only provided through convection and radiation. Thus, acceptable curing times or even curing of the binder material is not easily accomplished. Then particular additional measures are required like transporting the tube shells with a reduced velocity or special hot gas routing in the oven in order to provide uniform curing of the tube shells which, however, is detrimental or even impossible from a process point of view due to the additional complexity. It is appreciated that mineral wool, due to the air inclusion between the fibers, is a good insulator due to the insulating effect of the mineral wool, so that even for larger layer densities the introduced thermal energy only penetrates the interior of the products with difficulty and slowly. For this reason, in particular, tube shells are cured in special ovens, thus in microwave ovens. Thus, curing the mineral wool is provided through the microwaves generated in these ovens. The microwaves are characterized by good penetration characteristics into the mineral wool products and thus facilitate even heating, so that the tube shells can be cured easily rather independently of diameter and thickness. However, microwave ovens have energy disadvantages over tunnel ovens since they are operated with high value and thus expensive energy in the form of electrical power. Thus, the microwave oven is shielded relative to the adjacent production area due to the significant radiation.

However, since microwaves only penetrate the interior of mineral wool products with large layer thicknesses with difficulty, it is known in particular in conjunction with producing heat insulation shells or tubular shells for heat pipes and hot water pipes (DE 42 12 117 A1) to add a curing accelerator, thus dihydroxyaromate, in particular Recorcin, to the binder of mineral wool that is in particular impregnated with melamine binders. Using in particular Recorcin tends to form non-soluble products in conjunction with melamine binders which makes impregnating the mineral wool more difficult. Adding Recorcin thus requires quick placement into the oven after applying it to the mineral wool.

Independently from the curing process, it is known for formed components made of mineral wool to accumulate solid particles in an insular manner at the mineral fibers provided with binder material in order to obtain particular properties of the formed element. Thus, among other things, color particles are being used in order to obtain a desired through coloration of the mineral wool. In case a black coloration is desired, soot or graphite is accumulated, wherein due to the conductivity of the solid particles, the formed elements produced therewith can be used as faring plates with a shielding effect against radar waves. Through an installation of clay, shaped components with very high temperature resistance can be obtained, and through accumulation of active charcoal shaped elements can be obtained which are usable as water- or gas filters (EP 0 390 962 B1).

The inventors have found that the operating range of microwave ovens can be increased when energetic conditions are improved, so that using microwave ovens is also advantageous from a cost point of view since insulation materials typically are mass products. Thus, it is an object of the invention to provide an improved method for microwave curing of mineral wool including binders in microwave ovens, wherein the method has energy advantages and facilitates quick, cost-effective and reliable curing of mineral wool for forming mineral wool insulation products.

In one embodiments, the object is achieved by microwave curing mineral wool that is mixed with a binder material. Advantageous embodiments of the invention are characterized by the features included in the dependent claims.

The invention is characterized in that additional heat is generated within the microwave oven through the microwave curing process and thus within the mineral wool to be cured, so that the energy conditions are improved through separate heat supply. This is facilitated by adding microwave active substances which are applied to the fibers of the mineral wool or introduced into the mineral wool and thus preferably so that the substances are evenly distributed for curing the mineral wool and thus evenly distributed over the entire mineral wool structure. The mineral wool structure is also characterized by a plurality of mineral fibers which enclose air between one another and which are linked with one another through the binder material and thus connected. The air that is enclosed and restricted with respect to its motion is used as an insulator. By adding microwave active substances, the mineral wool to be heated is additionally heated by the heat released by the substances since the substances release heat when irradiated with microwaves and dissipate the heat into the ambient. By applying these microwave active substances, additional heat is applied which accelerates curing the binder material. Tests have shown that substantial energy savings can be obtained this way over microwave curing without microwave active substances. Thus, improved curing times can be obtained in spite of only introducing half the energy as microwave power, essentially a reduced curing time compared to mineral wool without substance can be obtained.

According to an advantageous embodiment of the invention, it is provided to apply the microwave active substances onto the fibers and/or the mineral wool or integrate them in particular through spraying, so that they are evenly distributed with respect to the binder material to be cured. This assures that constant conditions are provided over the mineral wool after the curing process so that the desired adjusted properties of the insulation material product are constant over the product. This prevents in particular that local overheating occurs due to uneven distribution which could have a degrading effect on the bonding. Even means that the microwave active substances are arranged proximal to the binder material or at the binder material, in particular in the portion of the bonding points of the fibers through the bonding material providing the cross-linking in view of the fiber structure of the mineral wool.

The microwave active substances can be applied simultaneously with the binder material, for example by applying the binder material and the microwave active substances onto the fibers in the drop channel. This is advantageously performed through a spraying process. However, it is also possible to apply the binder material with a time delay. Thus, it is particularly advantageous that the microwave active substances are applied after applying the binder material. For example, adding the binder material can be performed within the drop shaft and the application of the microwave active substances can be performed in particular through the fibers already stored on the endless conveyor belt for forming the mineral wool when configuring the tubular shells. Tubular shells are typically formed through winding in that a mineral wool web with low thickness configured on the endless conveyor belt is wound around a mandrel. Thus, the microwave active substances can be applied before the winding process through applying or spraying substances onto the mineral wool web. Through the winding process, a substantially even distribution of the microwave active substances is facilitated over the thickness of the tubular shell wound about a mandrel with respect to the binder material to be cured. The additional heat thus generated during the curing process through the microwave active substances affects the curing of the binder material in adjacent zones, so that an even curing of the binder material within the mineral wool is obtained. Thus, a homogenous distribution of the microwave active substances is achieved over the entire surface of the mineral wool web and also with respect to the binder material to be cured, since the additional heat does not only heat the binder material that is directly arranged at the microwave active substance, but a zone about the substance so that the binder material is cured accordingly.

It is an advantageous process measure to apply the substance together with the binder material. Thus, the microwave active substances are mixed with the binder material before the binder material is applied and they are then applied in a spraying process onto the fibers directly with the binder or into the mineral wool web. This advantageously leads to an even distribution of the microwave active substances with respect to the binder and to close spatial proximity and assures that the binder material is additionally heated by the microwave active substances uniformly through the mineral wool product and cured.

As microwave active substances, in particular carbon based substances are suitable for the invention, in particular soot or graphite. Alternatively, in particular soft magnetic substances are suitable. Among them are within the scope of the invention, iron, aluminum, silicon, nickel, iron oxide, FE-NI magnet alloys, iron silicides, magnetite and ferrites as soft oxide ceramic materials, in particular the so-called type IV manganese-zinc ferrite.

The substances are typically added in particle form, in particular as a powder. A preferred particle size is in a range of 10 μm to 100 μm. The particles can be provided as spheres, in particular in case of graphite (spherical graphite) or also as hollow elements, like in case of in particular blown graphites. However, also other shapes and particles are suitable, like e.g. a vermicular particle shape.

The inorganic microwave active substances are advantageously added in an amount of 0.05% to 4% of total weight of the binder material and the substance of the insulation material product or the mineral wool. In particular in an amount of 0.05% to 4% for inorganic iron oxides and in particular in an amount of 0.05% to 2.5%, preferably 0.05 to 2% by weight for graphite, petroleum coke or soot. In case of carbon based substances, in particular graphite, petroleum coke or soot, the introduced amount is 0.05% to 2.5%, preferably up to 2% in turn with reference to total weight. This range that is limited relative to the inorganic substances comes from the fact that an oxidation of the additives can occur when an excessive amount of graphite, petroleum coke or soot is added, which would lead to a disadvantageous rating in a fire resistance class for mineral wool products for fire protection, like for fire protection doors. The additional fire load introduced through microwave active substances graphite, petroleum coke or soot causes a short time temperature spike due to the oxidation of the graphite, petroleum coke and/or soot during a fire resistance test.

Any thermally curable binder material is suitable for performing the method, wherein the binder material is suitable for producing mineral wool products, in particular phenolic resin, phenolic formaldehyde resin, urea modified phenolic resins, urea modified phenolic formaldehyde resins, polyacrylic acids, neutralized binder material, in particular with ethanolamine, polyacrylic acids, carbohydrate based binder materials from regenerative raw materials, in particular based on sugar, molasses or starch or other mixes, wherein the binder material content depends on the required properties of the product and its use, however, preferably binder material or binder material mixes in an amount of 2 to 5% by weight are added with respect to total weight.

The invention is suitable for all mineral wool insulation products like for example mineral wool plates or webs, but in particular for tubular shells which are used in particular for insulating tubes. These tubular shells are also curable in tunnel ovens, however starting with particular diameters additional measures are required, like e.g. particular hot gas routing in order to evenly load the tubular shells with heat on both sides. Based on the measures according to the invention, it pays to use microwave ovens, since additional heat is introduced through installing microwave active substances, thus directly within the mineral wool in the portion of the binder material which leads to a concentrated heating of the binder material in the linked portion, in particular for linking the fibers, but also removes the energy disadvantage of microwave heating based on generating additional heat due to the installed microwave active substances.

These advantages of installing microwave substances are typically described based on tests.

Thus, shell pieces were heated for two minutes in a commercial microwave at different power settings and subsequently the temperature in the sample center was measured. This yields the values that can be derived from the subsequent table, wherein Mechano-Lube 1 (manufacturer: HC Carbon) was used for graphite and distributed with an amount of 2% by weight on the fibers of the mineral wool. The graphite was applied as so-called overspray simultaneously with the binder material in the drop shaft through a separate dosing system arranged above the bonding agent dosing device.

| | | Time [min] 2 |
|---|---|---|
| Graphite Additive | HC Carbon Output [W] | Mechano Lube 1 2% by weight T [° C.] |
| None | 700 | 50.0 |
| None | 700 | 51.1 |
| Graphite | 700 | 390 |
| Graphite | 462 | 227 |
| Graphite | 336 | 158 |

The tests were performed with additional power introduction. At a power of 700 watts without installing microwave substances, a temperature of 50° C. or 51.1° C. is measured in the sample center, whereas a temperature of 390° C. is caused in the shell pieces with 2% graphite. Even for half power, a core temperature of 158° C. was measured that is more than 100° C. higher than the temperature in the sample center. This means the shell provided with the microwave active substance graphite heats up significantly quicker at half power.

In an additional test series, the effect of microwave active additives upon particular sample elements made from fiber powder was tested. A two-component mix resin was used in this test series as a bonding agent system, wherein the first component was a common, non neutralized sodium catalyzed phenolic formaldehyde resin which is subsequently designated as R102. The second component was a polyacrylic acid that is neutralized with ethanolamine (PACS 100/45) made from a premix of a polyacrylic acid (PACS) with a molar weight of 10,000 g/mol, ethanolamine and water according to the subsequent table.

| Component | Mix [g] | Solid matter [%] | Solid matter [g] | Solid matter relative to resin [%] |
|---|---|---|---|---|
| PACS | 70.0 | 50 | 35 | 100 |
| Ethanolamine | 16.07 | 98 | 15.75 | 45 |
| Water | 40.80 | — | — | — |

For a binder material, according to the embodiment, a mix from the first component R102 and the second component PACS 100/45 with a solid resin content of 40% respectively with a solid resin ratio of 0.8:1 with a 1% addition with reference to the solid resin of a 3-aminopropyltriethoxysilans (CAS 919-30-2) was used.

In order to produce the sample elements, 2.75 g of the binder material are diluted with 800 mg water in order to produce the binder material compound. The fibers were taken out of the running glass wool production, pre-cut and subsequently powdered at 1200 rpm in a swing mill for 35 seconds, possibly adhering iron rub-off particles are removed to the largest extent possible with a magnet. 10 g of the fiber powder are supplemented in the embodiments with 50 mg of the respective microwave active additive and the mix is homogenized by dry mixing. The binder material mix is added to the homogenized mix and intensely mixed with a metal spatula. The paste is spread out on a glass plate that is wrapped with aluminum foil. Sample elements are cut out of the compound with a cork drill with a diameter of 5 mm. The sample elements are cured using a microwave device.

The sample elements were cured with otherwise identical conditions (stage 1 corresponding to a microwave power of 175 watts) in a first test series for 25 minutes and in a second test series for 30 minutes.

In case solid sample elements are obtained after the curing, the total mass of 8 sample elements is determined and the sample elements are subsequently stored at 70° C. in 200 g of completely desalinated water. After 24 hours (25 minutes curing) or 72 hours (30 minutes curing) and subsequently after 24 hours respectively, two sample elements are re-dried at 100° C. for 2 hours and their residual mass is determined. The residual mass of all non-dissolved sample elements is totaled and the total mass loss relative to the initial mass is determined based on the water accumulation as a measure for the curing quality.

The mechanical strength of the re-dried sample elements is subjectively assessed through manual pressing on the edge of the sample element and divided into five classes (no strength, little strength, strong, very strong, extremely strong).

The definition of the test parameters (point in time of extraction and temperature of the water accumulation) can be derived from the empirical correlations with long term tests for binding material aging which are characterized by the properties at 70° for four days.

The following products are used for microwave active additives:

Graphite Mechano Lube 1 (manufacturer HC Carbon)

Mechano-REM5 petroleum coke (manufacturer HC Carbon)

Magnetite M-20 T Colorana (manufacturer RG Minerals AS)

FeO Pigment F5100 (manufacturer Cathay Industries PRC)

Colanyl-Oxidrot B130 (manufacturer Clariant—comprising iron (III) oxide, amorphous silicon dioxide and propylene glycol).

The results are summarized in the subsequent table (the total mass loss is rounded).

| | | Test series 25 min curing | | | |
|---|---|---|---|---|---|
| Additive | Total mass loss | Strength after 24 h | Strength after 48 h | Strength after 72 h | Strength after 96 h |
| No additive | 100% | All samples disintegrate | — | — | — |
| Graphite Mechano Lube 1 | 41% | Very strong | Very strong | Strong | Strong |
| Mechano-REM5 Petroleum Coke | 25% | Very strong | Very strong | Very strong | Strong |
| Magnetite M-20 Colorana | 43% | Strong | Strong | Strong | No strength |
| FeO Pigment F5100 | 55% | Strong | Strong | Strong | Disintegrated |
| Colanyl-Oxidrot B130 | 100% | All samples collapse | — | — | — |

| | | Test series 30 minute curing | | | |
|---|---|---|---|---|---|
| Additive | Total mass loss | Strength after 72 h | Strength after 96 h | Strength after 120 h | Strength after 144 h |
| No additive | 46% | Strong | Very strong | Disintegrated | — |
| Graphite Mechano Lube 1 | 20% | Extremely strong | Very strong | Very strong | Extremely strong |
| Mechano-REM5 petroleum coke | 21% | Very strong | Very strong | Strong | Strong |
| Magnetite M-20 T Colorana | 51% | Strong | Very strong | Very strong | Very strong |
| FeO Pigment F5100 | 21% | Strong | Strong | Very strong | Very strong |
| Colanyl-Oxidrot B130 | 14% | Little strength | Little strength | Little strength | Little strength |

As can be derived from the table, the binder material without additives that is used as a reference sample has insufficient curing at a curing time of 25 minutes, all sample elements have disintegrated after a short period of time. Adding microwave active substances with the exception of Colanyl-Oxidrot B130 causes a significant improvement of the curing and the strength.

With an extension of the curing time to 30 minutes, the pure binder material just barely fulfills the requirements for long term properties after four days. All embodiments with microwave active substances, however, have a much higher durability after water accumulation since they have not even disintegrated after a test duration of 6 days. The subjective evaluation of the strength thus does not show any significant change of the strength over the test duration.

The invention claimed is:

1. A method for microwave curing mineral wool that is mixed with a binder material for producing mineral wool insulation products, wherein the mineral wool is mixed with the binder material and the mineral wool is subsequently run through a microwave oven for curing the binder material, wherein a curing process in the microwave oven is supported by generating additional heat by supplying microwave active substances to the mineral wool before curing, wherein the microwave active substances generate the additional heat for curing the binder material in the mineral wool through absorption of microwaves.

2. The method according to claim 1, wherein the microwave active substances are applied to the mineral wool so that the mineral substances are evenly distributed in the binder material for curing the binder material.

3. The method according to claim 1, wherein the microwave active substances are applied simultaneously or with a time offset with respect to the binder material.

4. The method according to claim 1, wherein the microwave active substances are added to the binder material and applied to the mineral wool directly with the binder materials.

5. The method according to claim 1, wherein a carbon based substance or an inorganic substance is used for the microwave active substances.

6. The method according to claim 1, wherein the microwave active substances are provided in particle form in a size in a range of 10 μm to 100 μm.

7. The method according to claim 1, wherein the microwave active substances with respect to total weight are added in an amount of 0.05% by weight to 4% by weight.

8. The method according to claim 1, wherein the binder is selected from the group consisting of a phenolic resin, a phenolic formaldehyde resin, a urea modified phenolic resins, a urea modified phenolic formaldehyde resins, a polyacrylic acids, and a neutralized binder materials made from regenerating raw materials, wherein the neutralized binder material is selected from the group consisting of an ethanolamine, or a carbohydrate based binder materials.

9. The method according to claim 1, further comprising winding the mineral wool with the microwave active substances about a mandrel before curing.

10. The method of claim 8, wherein the carbohydrate based binder material comprises a sugar, molasses, a starch, or combinations thereof.

11. The method of claim 1, wherein the binder is mixed to be between 2 and 5% of total weight.

12. The method of claim 1, wherein the mineral wool is glass wool or rock wool.

13. The method of claim 1, wherein the microwave active substances are sprayed on the mineral wool.

14. The method of claim 1, wherein the active microwave active substances are applied after applying the binder material.

15. The method of claim 5, wherein the carbon based substance is selected from the group consisting of a soot, petroleum coke or graphite, and wherein the inorganic substance are elected from the group consisting of a soft magnetic material, iron, an iron oxide, a magnetite, ferrite, or a manganese zinc ferrite.

16. A method for producing a mineral wool insulation product, comprising:
    mixing a mineral wool and a binder material to produce a mixture;
    applying a microwave active substance to the mixture to produce a coated mixture; and
    curing the binder material of the coated mixture in a microwave oven to produce the mineral wool insulation product, wherein the microwave active substance of the coated mixture generates and supplies additional heat to the coated mixture, wherein the microwave active substances of the coated mixture cures the binder material in the coated mixture through absorption of microwaves.

17. The method of claim 16, further comprising winding the coated mixture to produce a tubular sheet prior to curing.

18. The method of claim 16, wherein the binder is selected from the group consisting of a phenolic resin, a phenolic formaldehyde resin, a urea modified phenolic resins, a urea modified phenolic formaldehyde resins, a polyacrylic acids, and a neutralized binder materials made from regenerating raw materials.

19. A method to produce a tubular mineral wool insulation, comprising:
    spraying a binder material and a microwave active substance simultaneously on a mineral wool to produce a coated wool;
    winding the coated wool to produce a tubular coated wool; and
    curing the coated wool in a microwave oven to produce the tubular mineral wool insulation, wherein the microwave active substance of the coated wool generates and supplies additional heat to the coated wool to cure the binder material in the coated wool through absorption of microwaves.

20. The method of claim 19, wherein the binder is selected from the group consisting of a phenolic resin, a phenolic formaldehyde resin, a urea modified phenolic resins, a urea modified phenolic formaldehyde resins, a polyacrylic acids, and a neutralized binder materials made from regenerating raw materials.

* * * * *